(12) United States Patent
Green et al.

(10) Patent No.: US 8,494,727 B2
(45) Date of Patent: Jul. 23, 2013

(54) SYSTEM FOR REDUCING COMPACTION OF SOIL

(75) Inventors: Ole Green, Lem St. (DK); Dionysios D. Bochtis, Viborg (DK)

(73) Assignee: Aarhus Universitet, Århus C (DK)

( * ) Notice: Subject to any disclaimer, the term of this patent is extended or adjusted under 35 U.S.C. 154(b) by 0 days.

(21) Appl. No.: 13/511,808

(22) PCT Filed: Nov. 23, 2010

(86) PCT No.: PCT/DK2010/050317
§ 371 (c)(1),
(2), (4) Date: Aug. 23, 2012

(87) PCT Pub. No.: WO2011/063814
PCT Pub. Date: Jun. 3, 2011

(65) Prior Publication Data
US 2012/0323452 A1  Dec. 20, 2012

(30) Foreign Application Priority Data
Nov. 25, 2009  (DK) .................................. 2009 70230

(51) Int. Cl.
*G06F 7/70* (2006.01)
(52) U.S. Cl.
USPC ............... 701/50; 701/41; 701/71; 701/82; 701/90; 180/14.2; 180/9.1; 180/9.21; 180/9.46; 180/9.48; 305/111; 305/116; 305/124; 305/131; 305/138; 172/3; 172/4.5; 172/7; 111/52
(58) Field of Classification Search
USPC ............... 701/41, 50, 71, 82, 90; 180/14.2, 180/9.1, 9.21, 9.46, 9.48, 9.54, 906; 305/111, 305/116, 124, 131, 138, 170, 136; 172/3, 172/4.5, 7; 702/5; 111/52
See application file for complete search history.

(56) References Cited

U.S. PATENT DOCUMENTS

| | | | |
|---|---|---|---|
| 4,102,402 A * | 7/1978 | Steinberg | 172/40 |
| 5,841,282 A | 11/1998 | Christy et al. | |
| 6,003,455 A * | 12/1999 | Flamme et al. | 111/200 |
| 6,041,582 A | 3/2000 | Tiede et al. | |
| 6,119,531 A * | 9/2000 | Wendte et al. | 73/863.52 |
| 6,128,574 A | 10/2000 | Diekhans | |
| RE37,174 E * | 5/2001 | Grawey et al. | 180/9.21 |
| 6,549,849 B2 | 4/2003 | Lange et al. | |
| 7,302,837 B2 | 12/2007 | Wendte | |
| 7,725,233 B2 * | 5/2010 | Hendrickson et al. | 701/50 |
| 2002/0022929 A1 | 2/2002 | Ell | |

FOREIGN PATENT DOCUMENTS

EP    2 267 566 A2    12/2010

\* cited by examiner

*Primary Examiner* — McDieunel Marc
(74) *Attorney, Agent, or Firm* — Knobbe Martens Olson & Bear LLP (57) ABSTRACT

In order to achieve a solution which assists a farmer in working land in a way which reduces the risk of soil compaction of the land there is, among others, a method of determining a work trajectory to be followed by an agricultural work vehicle. The method includes accessing a soil carry capacity map of an area of land to be worked by the agricultural work vehicle, receiving load data of the agricultural work vehicle so as to determine the agricultural work vehicle load and determining the work trajectory to be followed by the agricultural work vehicle. The work trajectory is determined by correlating the soil carry capacity map and the load data of the agricultural work vehicle, so as to optimize that the area to be worked with low carry capacity is worked with low agricultural work vehicle load.

18 Claims, 6 Drawing Sheets

SYSTEM FOR REDUCING COMPACTION OF SOIL

CROSS REFERENCE TO RELATED APPLICATIONS

This application claims the benefit and priority to and is a U.S. National Phase Application of PCT International Application Number PCT/DK2010/050317, filed on Nov. 23, 2010, designating the United States of America and published in the English language, which is an International Application of and claims the benefit of priority to Danish Patent Application No. PA 2009 70230, filed on Nov. 25, 2009. The disclosures of the above-referenced applications are hereby expressly incorporated by reference in their entireties.

FIELD OF THE INVENTION

The present invention relates to a decision support system and other means for determining a work trajectory to be followed by an agricultural work vehicle. In particular, the invention relates to means for reducing compaction of soil.

BACKGROUND OF THE INVENTION

Compaction of agricultural soils is a great concern to many farmers, since soil compaction may reduce plant growth. Soil is made of soil particles which normally pack loosely, forming a soil structure filled with pore spaces. Soil compaction occurs when soil particles are forced closer together so that pore space is reduced. Soil structure impacts the ability of soil to absorb and conduct water, nutrients and air necessary for plant root growth activity. Compaction of the soil may in some situations be permanent, while in other situations it may be possible to de-compacted the soil. However, de-compaction of soil is expensive in terms fuel and labour.

Agricultural vehicle traffic is a major cause of soil compaction, since agricultural vehicles are getting so heavy that they impose enormous downwards forces onto the ground.

U.S. Pat. No. 7,302,837 discloses a tyre inflation system for use with an agricultural implement that is linked to a work vehicle for movement in the field. The inflation system comprises a processor. The processor determines, based on various factors including the soil condition and implement load, the proper inflation of the implement tyres. Adjustment of the inflation of the tyres only changes the contact pressure with a given amount. With large agricultural work vehicles it may be insufficient to just adjusting the inflation of the tyres in order to avoid damaging compaction of the soil.

Modern agricultural work vehicles may be equipped with a route planning systems assisting the farmer in selecting a work path through the field. The U.S. Pat. No. 6,128,574 discloses to input at least one field specific datum and at least one vehicle specific datum into a central computing unit to generate a work path over a field, which includes at least one optimization criterion for the work path. The patent discloses to avoid undesirable packing of the ground by avoiding multiple passes with heavy units. However with a sufficiently heavy agricultural work vehicle or during unfavourable soil conditions, a single pass may be sufficient to damage the soil.

SUMMARY OF THE INVENTION

It would be advantageous to achieve a solution which assists the farmer in working the land in a way which reduces the risk of soil compaction. In particular it would be advantageous to achieve a solution which easily can be integrated with, and which supports, the normal working routine of the farmer. In general, the invention preferably seeks to mitigate, alleviate or eliminate one or more of the above mentioned disadvantages singly or in any combination. In particular, it may be seen as an object of the present invention to provide a method that solves the above mentioned problems, or other problems, of the prior art.

In a first aspect of the invention, there is presented a decision support system for determining a work trajectory to be followed by an agricultural work vehicle, the system comprising:
 a soil carry capacity unit for accessing a soil carry capacity map of an area to be worked by the agricultural work vehicle;
 a load unit for receiving load data of the agricultural work vehicle so as to determine the agricultural work vehicle load;
 a trajectory unit for determining the work trajectory to be followed by the agricultural work vehicle;
wherein the work trajectory is determined by correlating the soil carry capacity map and the load data of the agricultural work vehicle, so as to optimize that the area to be worked with low carry capacity is worked with low agricultural work vehicle load.

The invention thus provides a decision support system (DSS). The DSS may be used to assist the farmer in determining an optimal work path or route through a field, or the DSS may be implemented into an auto-steering system to be used for automatic working of farmland. The DSS may be implemented into a computer system suitable for mount on a control panel or in the driver's cab of the work vehicle, in alternative embodiments the DSS may be implemented into a central computing unit for performing the calculations and transmitting the result or a partial result to the work vehicle.

The invention relies on the access to a soil carry capacity map and finding an optimal trajectory through the map with the optimization criteria that the load on the soil is minimized.

The soil carry capacity map should reflect the ability of the soil to support the weight of the machines used to work the fields. Important parameters in this respect relates to the texture of the soil as well as to the water or moisture level of the soil. The soil carry capacity map may therefore be based on a map of the texture of the soil and/or on a map reflecting the soil moisture level. A high moisture level will typically be reflected by a low electrical resistivity, and the soil carry capacity map may therefore be based on a soil electrical conductivity map. A geographical information map may also be used to extract relevant soil values on which the soil carry capacity map can be based. Moreover, also such maps as a height contour map of the area to be worked may be used, since lower lying areas are typically more prone to soil compaction than higher lying areas. In lack of a soil carry capacity map based on measured quantities, the farmer may indicate on a map areas which he or she knows from his or her experience are prone to soil compaction and use this map as the soil carry capacity map.

It is an advantage that the soil carry capacity map need not be on a particular form, as long as it reflects the tendency of the soil to compact upon exposure to load. Detailed soil analysis to determine the soil structure and carry capacity is difficult to perform, however, the invention work with any kind of map which reflects the bearing strength of the soil.

The invention relies on the insight that an area to be worked which has a low carry capacity should be worked with a low agricultural work vehicle load. This may be achieved by use of a suitable optimization algorithm where the carry capacity or a measure of the carry capacity of the area to be worked is correlated to the load of the work vehicle so as to determine a trajectory or path through the area to be worked where the impact of the load to the soil is minimized. An example of a specific embodiment based on graph theory is provided in the section related to description of embodiments.

In second aspect of the invention, the invention relates to a method of determining a work trajectory to be followed by an agricultural work vehicle, the method comprising:

accessing a soil carry capacity map of an area to be worked by the agricultural work vehicle;

receiving load data of the agricultural work vehicle so as to determine the agricultural work vehicle load;

determining the work trajectory to be followed by the agricultural work vehicle;

wherein the work trajectory is determined by correlating the soil carry capacity map and the load data of the agricultural work vehicle, so as to optimize that the area to be worked with low carry capacity is worked with low agricultural work vehicle load.

In a third aspect of the invention, the invention relates to a computer program product, when running on a computing device, being adapted to perform the method of the second aspect. The computer program product may be provided to implement the functionality of the DSS according to the first aspect or the method according the second aspect onto a general purpose computing platform.

In a fourth aspect of the invention, the invention relates to an agricultural work vehicle comprising a decision support system in accordance with the first aspect of the invention. The agricultural work vehicle may be a manned vehicle or an autonomous vehicle such as a field robot.

The individual aspects of the present invention may each be combined with any of the other aspects. These and other aspects of the invention will be apparent from the following description with reference to the described embodiments.

BRIEF DESCRIPTION OF THE FIGURES

Embodiments of the invention will be described, by way of example only, with reference to the drawings, in which.

DESCRIPTION OF EMBODIMENTS

The work plan of a farmer is influenced by many factors, some of which are very decisive for the detailed schedule. For example, due to local regulations, the spreading of manure may only be done legally during predetermined periods. Another example relates to harvesting of crops. Crops can be harvested only during the short period where it is ripe.

However, the farmer also needs to consider the effect that working the fields has on the soil. Trafficking farmland using heavy machinery on soil with high water content induces a high risk of compacting the soil and thereby drastically reducing the coming years' yield. But the fields need to be worked during spring and autumn where the water content in the soil may be very high at certain areas. Thus, the farmer is often put in a situation where he or she needs to work the field during non-optimal conditions. Embodiments of the present invention provide a decision support system (DSS) which can assist the farmer in determining an optimal trajectory of an agricultural work vehicle through a field so that the risk of soil compaction is minimized. The agricultural work vehicle can be any type of work vehicle used in modern farming, such as a harvester or a tractor, moreover, the work vehicle can be a single vehicle or two (or in principle more) vehicles coupled together, e.g. a tractor with an implement attached.

Figure 1:
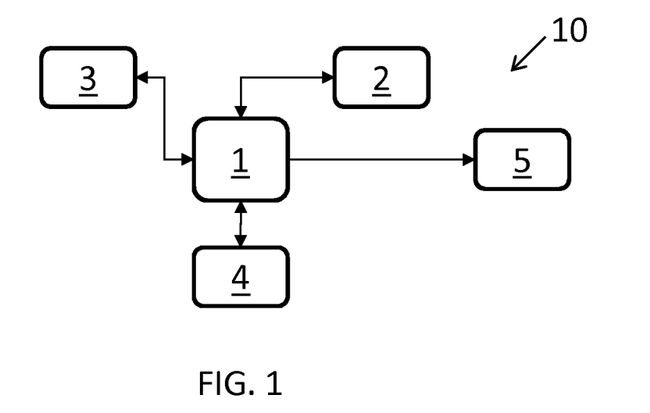
FIG. 1 illustrates a schematic block representation of functional units of a decision support system.

FIG. 1 illustrates a schematic block representation of functional units of a DSS 10 in accordance with embodiments of the present invention. The DSS is schematically represented by a central unit 1 connected to a number of functional units 2-5. This representation is merely for illustrative purposes, the specific implementation may be done in any suitable way. The DSS comprises a central unit 1 in communicative connection with a soil carry capacity unit 2, a load unit 3 and a trajectory unit 4. Based on inputs received from these units, a decision is output in the form of a suggested trajectory 5.

Figure 2:
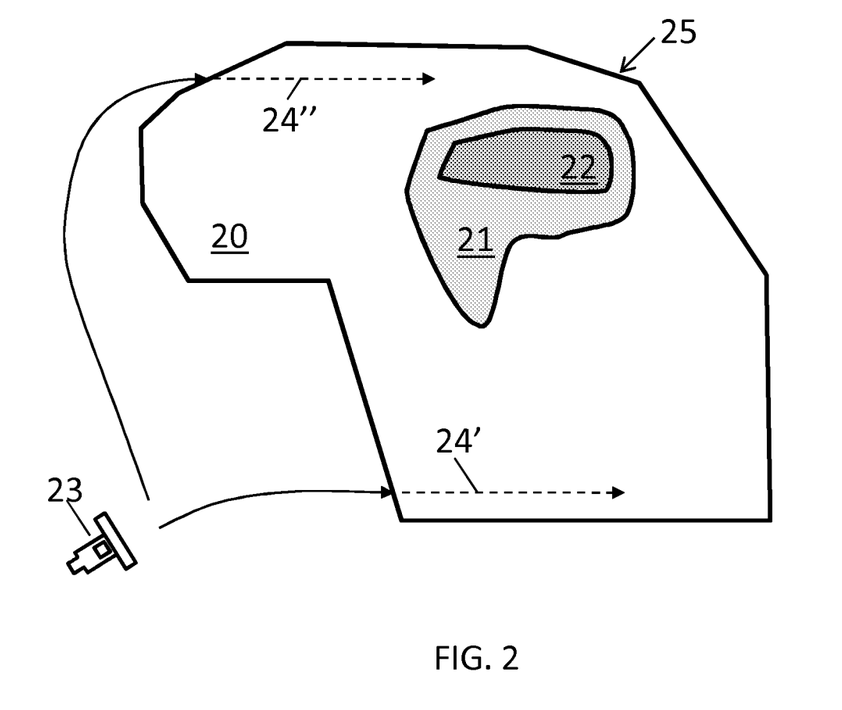
FIG. 2 schematically illustrates an area to be worked with a harvester.

FIG. 2 schematically illustrates an area to be worked 25 with a harvester 23. The area to be worked comprises three regions 20-22 each with different carry capacities. The area marked 20 has a high carry capacity, the area marked 21 has a medium carry capacity and the area marked 22 has a low carry capacity. Typically, the farmer prefers to drive the field along a tramline pattern, i.e. along parallel tracks, the tramlines typically being parallel to an edge of the field. Traditionally, the farmer would choose a start trajectory running parallel with a side, e.g. either trajectory 24' or 24", and then track-by-track work his or her way to the other edge.

In an important embodiment of the invention the harvester 23 is equipped with or communicatively connected to a DSS 10 as generally depicted in FIG. 1. Moreover, the harvester is equipped with a load sensor suitable for detection or estimating on-line or actual load data of the harvester. The DSS accesses a soil capacity map of the area to be worked, e.g. from a remote computing facility or from an internal storage unit. In the illustrated embodiment, the soil capacity map assigns a capacity score to each of the three regions 20-22. The score reflecting the soil carry capacity of the soil in the relevant regions of the map. As an example, a score of 0 may be assigned to the region 20 indicating that this area can be worked with no or only little risk of soil compaction; a score of 25 may be assigned to the region 21 indicating that this area can be worked with low to medium risk of soil compaction; and a score of 150 may be assigned to the region 22 indicating that this area can be worked with a high risk of soil compaction. The DSS implements an optimization algorithm which correlates the soil carry capacity map and the load data of the agricultural work vehicle so that the area to be worked with low carry capacity is worked with low agricultural work vehicle load. Ideally the region 22 should be worked with lowest agricultural work vehicle load, region 21 with next-lowest vehicle load and region 22 with highest vehicle load. In a real work situation, this however may neither be practical nor possible.

The soil carry capacity map may be a map which reflects a calculated or estimated carry capacity of each area of the area to be worked. This carry capacity can be based on the texture of the soil, such as on the composition and water content, as well as other factors to calculate to calculate a capacity measure. The capacity measure may e.g. be calculated in terms of the depth to which a given pressure propagates in the soil, e.g. the depth to which e.g. a vertical pressure of 50 kPa propagates. However, the soil capacity map may also be based on specific data, such as soil electrical conductivity data, where areas of high soil electrical conductivity is assigned to areas of low carry capacity and areas of low soil electrical conductivity is assigned to areas of low carry capacity, as this is the typical situation. Other types of data indicative of the carry capacity of the soil may also be used as a basis for the map, either directly or used in a calculation or estimation of a capacity measure.

Figure 3:
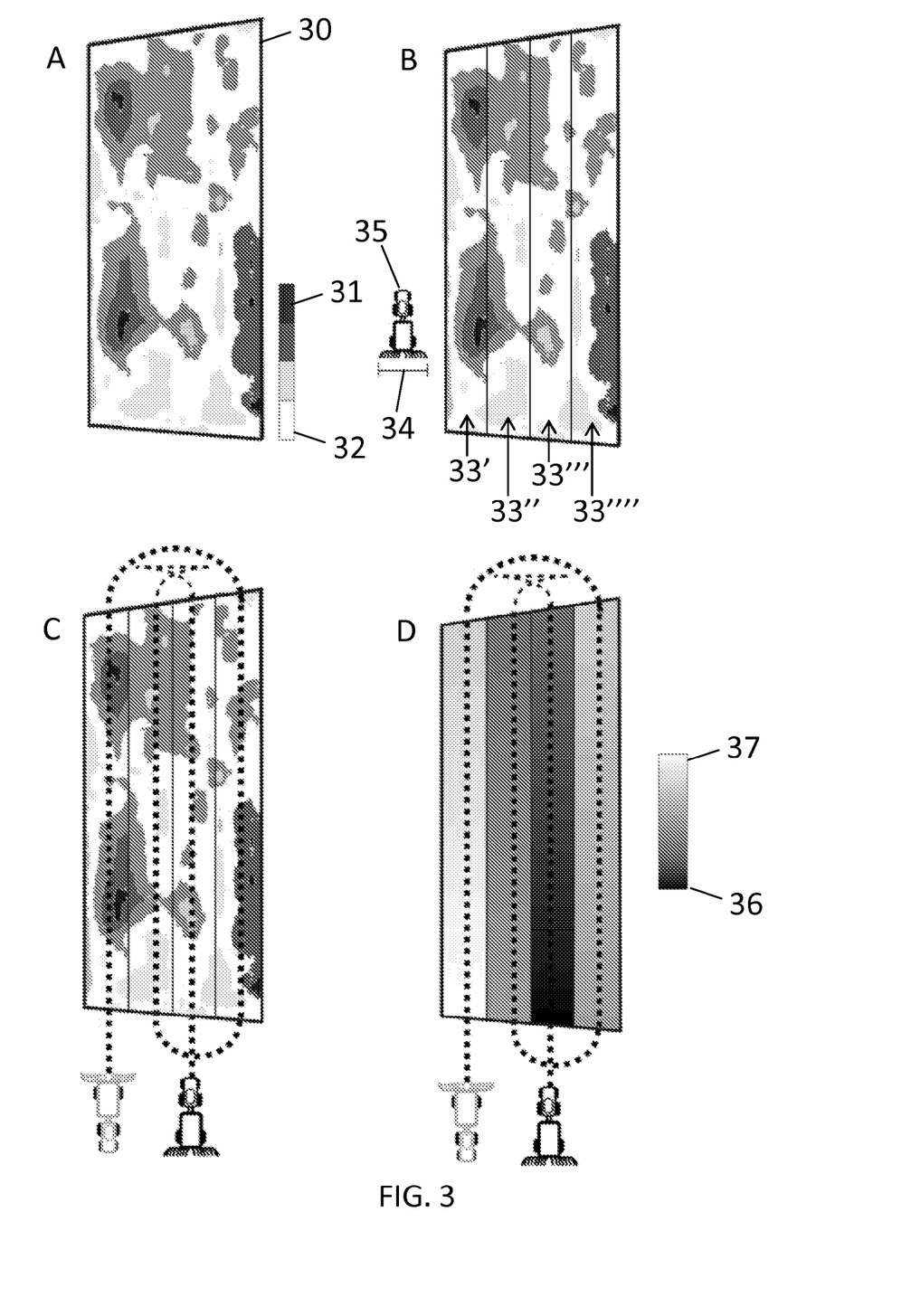
FIG. 3A, FIG. 3B, FIG. 3C and FIG. 3D schematically illustrate example of the determination of the work vehicle trajectory where the work trajectory is the order to work individual tramlines.
Figure 4:
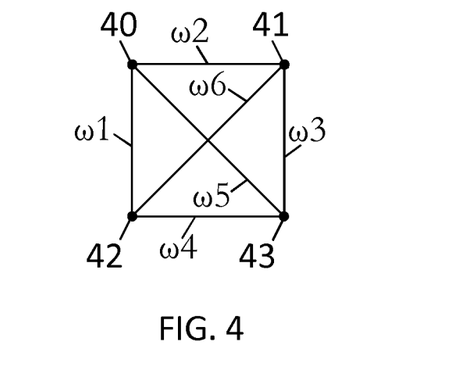
FIG. 4 schematically illustrates an embodiment of an optimization method in the form of a weighted graph.

FIGS. 3 and 4 schematically illustrates a simplified example of the determination of the work vehicle trajectory where the work trajectory to be followed is constrained to a predefined tramline pattern and wherein the work trajectory is the order to work the individual tramlines. By tramlines is meant a pattern of parallel tracks, as is generally used in the art.

FIG. 3A shows a soil carry capacity map 30 of an area to be worked. Areas of low carry capacity are indicated by dark colours 31 and areas of high carry capacity are indicated by light colours 32. This colour code is used for all soil carry capacity maps shown in the figures.

FIG. 3B shows the soil carry capacity map with a tramline pattern overlayed, here in the form of four tracks 33' to 33''''. The number of tracks is based on the work width 34 of the agricultural work vehicle 35, here in the form of a tractor with an implement.

An embodiment of determining the order in which to follow the tracks is disclosed with reference to FIG. 4.

FIG. 4 illustrates a weighted graph where each node 40-43 represents a single track 33' to 33'''', and where the number of nodes is equal to the number of tracks (four in the present example). Travelling all field tracks is equivalent to visiting all nodes in the graph. Each arc joins two nodes, and to each arc is associated a cost ω1 to ω6 which corresponds with the carry capacity of the track when going from one end to the other. The carry capacity may be set as the average carry capacity along the track or by any other means. The order to work the individual tracks 33' to 33'''' is determined by minimizing the cost under the constraint that all nodes should be visited. In an alternative embodiment, a graph search or tree traversal algorithm may be used determine the optimal trajectory. In general, however, a number of methods for minimizing a cost function expressed by a graph are known to the skilled person.

FIG. 3C illustrates the outcome of the optimization so that the tracks are followed in a way where areas with low carry capacity is worked with low agricultural vehicle load. In the current example, the load is decreasing, e.g. due to spreading of manure by use of an implement. The optimal sequence of tracks is: 33'''→33''→33''''→33'. In the harvesting case, where the load increases, the sequence would be reversed.

FIG. 3D illustrates the implement load in terms of grey-scale colours, ranging from high low 36 to low load 37 in accordance with the emptying of the implements.

In the example of FIG. 3, the load data may be based on an estimated load profile determined by known rate of emptying the implements. A typical implement for spreading a substance may be set to a given spread rate.

In situations, it may however be an advantage to receive the load data continuously and in real-time or at least at time intervals during the actual work, and performing the optimization continuously, or at least at time intervals during the actual work. In this way, the work trajectory may be based on actual work conditions for the agricultural work vehicle.

The load data may e.g. be converted to a vertical pressure imposed by the work vehicle, for example by use of the Danish online database "Jordværn" (www.planteinfo.dk; sheet 'jord'). The online tool predicts the contact area, the stress distribution within the contact area, and the stress distribution in the soil profile below mounted tyres based on wheel loads and tyre inflation pressure.

In an embodiment, the agricultural work vehicle comprises or is operated by use of a positioning system, such as a system using a GPS, where the positioning system maps the area that is to be worked and the area that has already been worked, e.g. by use of a known work-width of the agricultural work vehicle and a monitoring of the worked area. As an alternative to a GPS, also a relative positioning system may be used.

Figure 5:
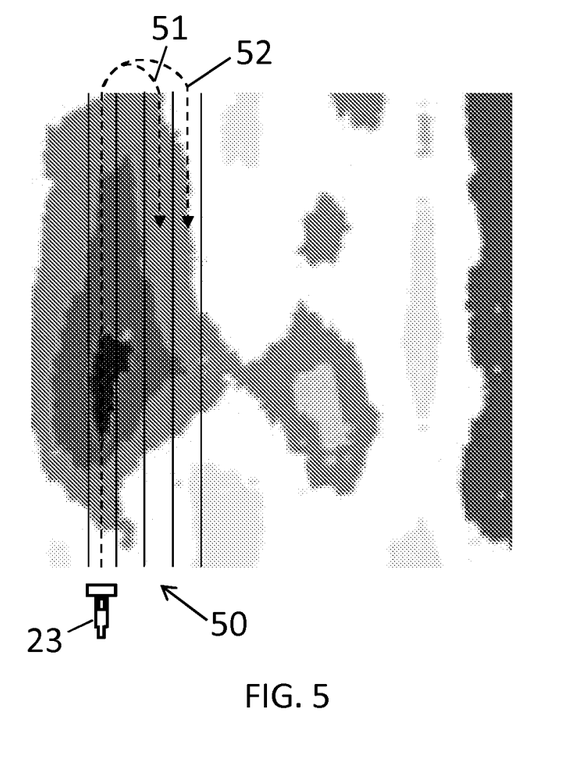
FIG. 5 illustrates a soil carry capacity map and a harvester in a situation where the actual load depends on the yield in a given track.

FIG. 5 illustrates a soil carry capacity map, an agricultural work vehicle 23 in the form of a harvester where the load increases during the harvesting, four tracks 50 and two example trajectories 51, 52. In connection with e.g. harvesting may the load profile of the harvester along a trajectory depend on the actual work conditions and vary somewhat from track to track. For example, the actual crop yield may vary somewhat from track to track, or from area to area. In such a situation it may be an advantage to determine the next track to follow online during the actual work. In this way, after completion of the first track, the determination of the next track, e.g. whether to follow trajectory 51 or trajectory 52, may depend upon the actual load of the harvester. Possible, the load data may be based on a combination of actual load data of the harvester and forecast of the expected load gain along a next track. In an embodiment, this may be implemented by basing the load data on an estimated load profile, which is adaptively updated with measured load data. In the example of FIG. 5, the outcome of the optimization may be trajectory 51 if the actual load of the work vehicle at the end of the first track is lower than average, whereas the outcome of the optimization may be trajectory 52 if the actual load of the work vehicle at the end of the first track is higher than average. By monitoring the load during working of the area, the risk of soil compaction of the area is minimized.

Figure 6:
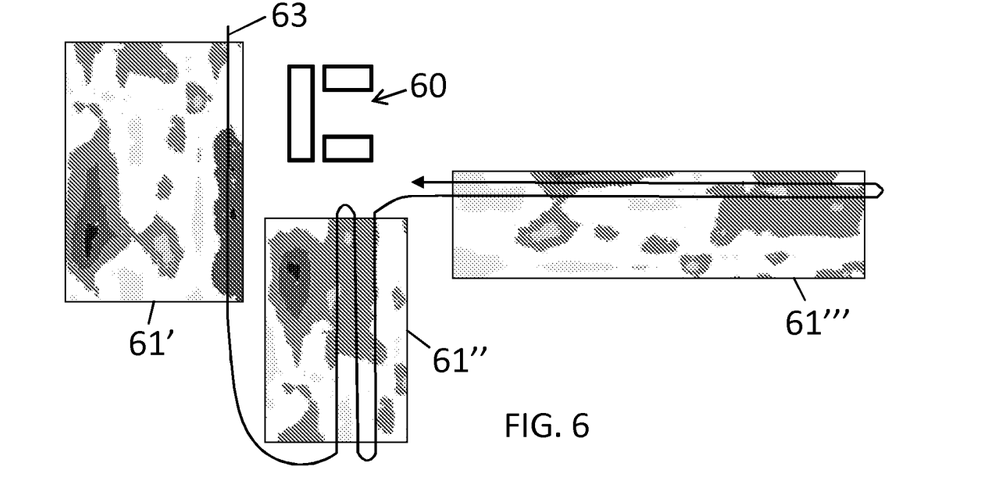
FIG. 6 illustrates an embodiment, where the area to be worked comprises a collection of separate fields.

FIG. 6 illustrates an embodiment, where the area to be worked comprises a collection of separate fields 61' to 61'''. In the illustrated example, a farm 60 is surrounded by three fields. By using the entire area in the three fields as the area to be worked, an even more detailed trajectory 63 can be determined which is not limited to completing one field before another field is visited. By use of a positioning system the farmer may keep track on which parts of the fields that already have been worked, and which parts that still need to be worked.

Figure 7:
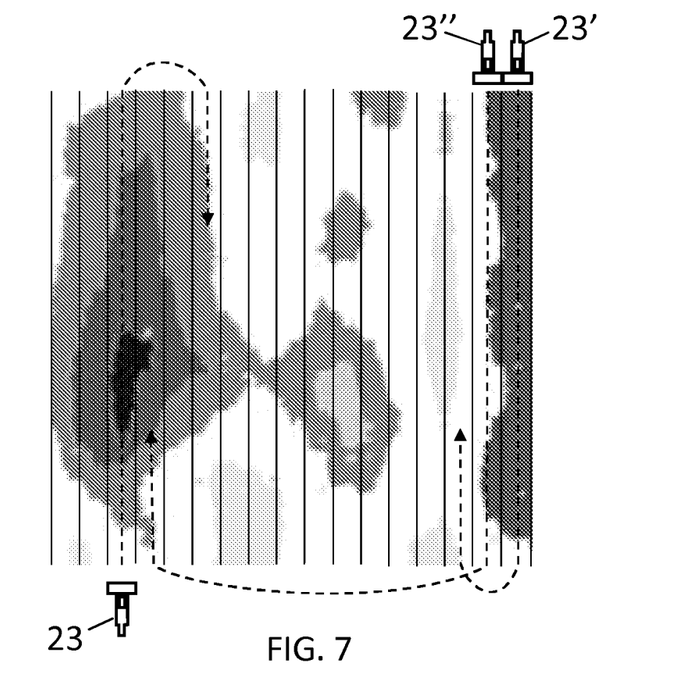
FIG. 7 illustrates an embodiment wherein the work trajectory is determined for two or more agricultural work vehicles.

FIG. 7 illustrates an embodiment wherein the work trajectory is determined for each of two or more agricultural work vehicles, here exemplified with three harvesters 23, 23', 23''. It is not uncommon that a farmer possesses more than one piece of a given type of agricultural work vehicle. By optimizing the work trajectory to include more vehicles it may be possible to ensure that areas with a very high risk of soil compaction only are only worked with work vehicles of minimal weight. In a real harvesting situation, the farmer would be hesitant to empty a partially filled harvester before harvesting a given area. By using more harvesters the likelihood to find a trajectory through the field which on one hand ensures optimal production time of the harvesters and on the other hand ensures that the areas with very high risk of soil compaction is only worked with minimal (i.e. empty or nearly empty) weight of the harvester. In the embodiment where more than one work vehicle is used, the work trajectory is in fact a number of work trajectories, i.e. one trajectory for each work vehicle.

Figure 8:
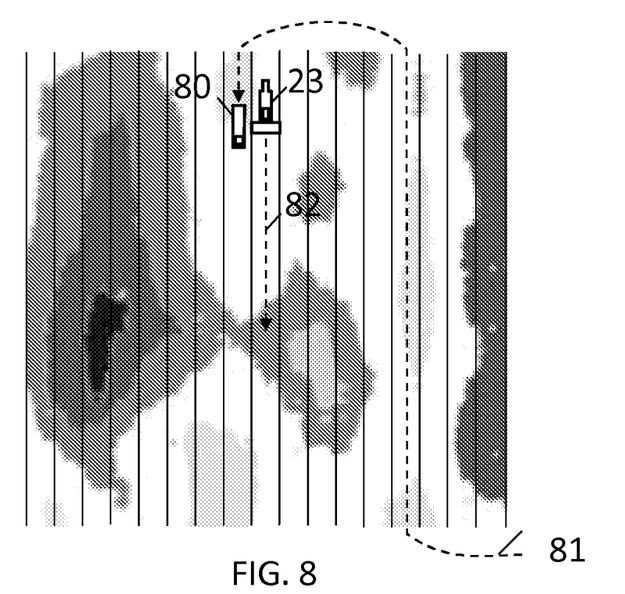
FIG. 8 illustrates an embodiment wherein the trajectory unit further determines a work trajectory to be followed by one or more agricultural support vehicles.

FIG. 8 illustrates an embodiment wherein the trajectory unit further determines a work trajectory to be followed by one or more agricultural support vehicles 80. The trajectory of the support vehicle is determined by further correlating the soil carry capacity map and load data of the agricultural support vehicles, so as to optimize that an area with low carry capacity is driven with low agricultural support vehicle load. It is common, e.g. in connection with harvesting to unload the harvester 23 in the field or even during harvesting by use of a support vehicle, or in connection with slurry distribution to refill the slurry tank in the field. However, also the support vehicle may impose harmful soil compaction to the area that is driven. By use of the load data, e.g. in terms of an estimated time for emptying or refilling of the work vehicle, both the trajectory of the support vehicle as well as the trajectory of the work vehicle can be determined so that the emptying occurs at a position which can support the weight of the support vehicle. Moreover, also the trajectory 81 from a park position to the support position can be determined so that only areas which can support the weight of the support vehicle are driven.

Figure 9:
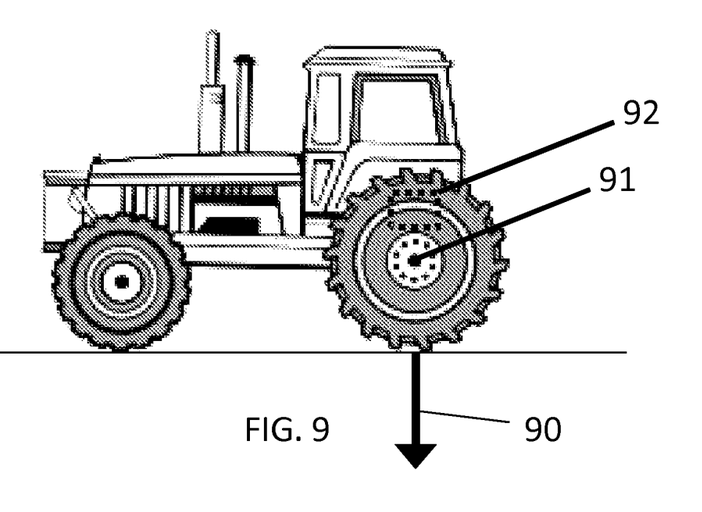
FIG. 9 illustrates a work vehicle in the form of a tractor.

FIG. 9 illustrates a work vehicle in the form of a tractor. Soil compaction is related to the downward pressure 90 imposed by the work vehicle to the soil. In principle, any suitable way of providing a measure of this pressure may be used. In an advantageous embodiment, the downward pressure is based on measured axle load on one or more of the axles of the agricultural work vehicle, possible correlated with known contact area of the tyres. In an embodiment, the axle load may be determined by a sensor 91 positioned in contact with an axle. Such a sensor may e.g. be a piezo-based strain sensor. In the illustrated embodiment, the sensor 91 is positioned on the back-axle of the tractor, and it may be sufficient to determine this load since this is the axle which carries the most weight. The sensor may, however, be positioned on other axles. The positioning of the sensor may for other types of work vehicles be positioned in accordance with the type of the work vehicle. Advantageously, if the tractor pulls an implement (not shown) the sensor may be placed at an axle, or at other appropriate location of the implement.

Moreover, the decision support system may further be connected to a tyre pressure unit 92 which receives tyre pressure data, and which outputs a signal suitable for optimizing the tyre pressure in accordance with the soil capacity of the work trajectory to be followed. Adjusting the tyre pressure may assist in minimizing the impact of the work vehicle on the soil.

Figure 10:
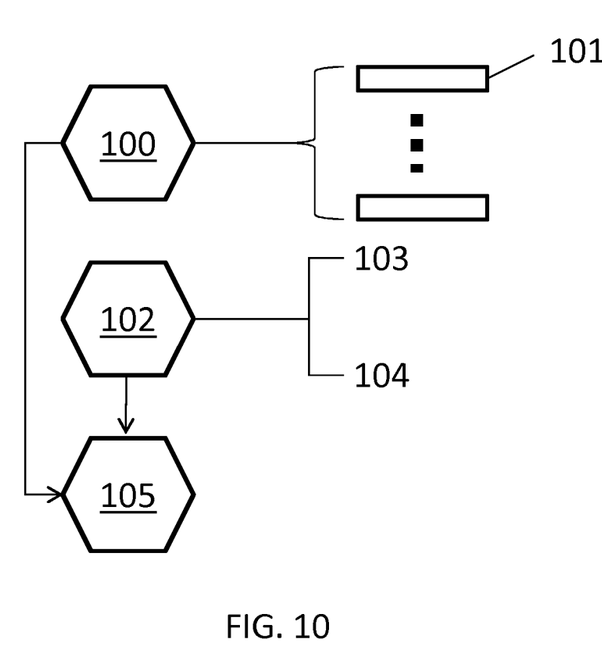
FIG. 10 illustrates a schematic flow diagram of a general embodiment of determining a work trajectory to be followed by an agricultural work vehicle.

FIG. 10 illustrates a schematic flow diagram of a general embodiment of determining a work trajectory to be followed by an agricultural work vehicle. The functionality of the flow diagram may be implemented by a computing device. To begin, a soil carry capacity map of the area to be worked is access 100. The soil carry capacity map may be accessed from a variety of sources 101. For example it may be accessed from a geographical information system GIS. It may be accessed from computer system relating to the characteristics of the field of the given farm, it may be accessed dedicated map which has been calculated in order to map the carry capacity of the field to be worked, etc. The soil carry capacity map is typically stored in the memory of the computing device.

Next, the load data of the agricultural work vehicle is received 102. The load data may be received from two sources, one source 103 being a load senor, and another source being a load profile 104. The load profile may e.g. be stored together with other machine specific data that may be used.

Based on the carry capacity map 100 and the load data 102, the work trajectory to be followed by the agricultural work vehicle is determined 105 in accordance with embodiments of the present invention.

Examples have been provided where the determination of the work trajectory is primarily conditioned upon minimizing the impact of the load on the soil. In embodiments, however, the minimization may further be conditioned upon additional factors as well. In terms of the graph optimization method as discussed in connection with FIG. 4, adding additional minimization criteria may be done by basing the minimizing on a cost function which comprises additional contributions. In an embodiment, the minimization may further be conditioned upon the non-working distance travelled by the agricultural work vehicle, productive time of the agricultural work vehicle, operational time of the agricultural work vehicle, fuel consumption of the agricultural work vehicle, as well as other criteria.

In short it is herein disclosed that in order, e.g., to achieve a solution which assists a farmer in working land in a way which reduces the risk of soil compaction of the land there is, among others, disclosed a method of determining a work trajectory to be followed by an agricultural work vehicle. The method includes accessing a soil carry capacity map of an area of land to be worked by the agricultural work vehicle, receiving load data of the agricultural work vehicle so as to determine the agricultural work vehicle load and determining the work trajectory to be followed by the agricultural work vehicle. The work trajectory is determined by correlating the soil carry capacity map and the load data of the agricultural work vehicle, so as to optimize that the area to be worked with low carry capacity is worked with low agricultural work vehicle load.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A decision support system for determining a work trajectory to be followed by an agricultural work vehicle, the system comprising:
    a soil carry capacity unit for accessing a soil carry capacity map of an area to be worked by the agricultural work vehicle;
    a load unit for receiving load data of the agricultural work vehicle so as to determine the agricultural work vehicle load;
    a trajectory unit for determining the work trajectory to be followed by the agricultural work vehicle;
    wherein the work trajectory is determined by correlating the soil carry capacity map and the load data of the agricultural work vehicle, so as to optimize that the area to be worked with low carry capacity is worked with low agricultural work vehicle load.

2. The decision support system according to claim 1 further comprising a positioning system, wherein the positioning system comprises a map of the area to be worked and the work-width of the agricultural work vehicle so as to store which areas that have already been worked; and to remove this area from the area to be worked.

3. The decision support system according to claim 2, wherein the load data is received continuously and, wherein the area to be worked is updated continuously, so that the work trajectory is based on actual work conditions for the agricultural work vehicle.

4. The decision support system according to claim 1, wherein the soil carry capacity map is based on a soil texture map of the area to be worked.

5. The decision support system according to claim 1, wherein the soil carry capacity map is based on a soil electrical conductivity map of the area to be worked.

6. The decision support system according to claim 1, wherein the soil carry capacity map is based on a geographical information map.

7. The decision support system according to claim 1, wherein the soil carry capacity map is based on a soil moisture level map.

8. The decision support system according to claim 1, wherein load data of the agricultural work vehicle is based on measured axle load on one or more of the axles of the agricultural work vehicle and/or an implement of the agricultural work vehicle.

9. The decision support system according to claim 1, wherein the load data of the agricultural work vehicle load is based on an estimated load profile.

10. The decision support system according to claim 9, wherein the load data of the agricultural work vehicle load is based on an estimated load profile adaptively updated with the measured axle load.

11. The decision support system according to claim 1, wherein the work trajectory to be followed is constrained to a predetermined tramline pattern, and wherein the work trajectory is the order to work the individual tramlines.

12. The decision support system according to claim 1, wherein the determination of the work trajectory is further conditioned upon minimizing one or more of: the non-working distance travelled by the agricultural work vehicle, productive time of the agricultural work vehicle, operational time of the agricultural work vehicle, or fuel consumption of the agricultural work vehicle.

13. The decision support system according to claim 1, wherein the decision support system further comprises a tyre pressure unit, which receives tyre pressure data, and which outputs a signal suitable for optimizing the tyre pressure in accordance with the soil capacity of the work trajectory to be followed.

14. The decision support system according to claim 1, wherein the area to be worked comprises a collection of separate fields.

15. The decision support system according to claim 1, wherein the work trajectory is determined for each of two or more agricultural work vehicles.

16. The decision support system according to claim 1, wherein the trajectory unit further determines a work trajectory to be followed by one or more agricultural support vehicles; and wherein the work trajectory for the one or more agricultural support vehicles is determined by further correlating the soil carry capacity map and load data of the agricultural support vehicles, so as to optimize that an area with low carry capacity is driven with low agricultural support vehicle load.

17. An agricultural work vehicle comprising a decision support system in accordance with claim 1.

18. A method of determining by a processor a work trajectory to be followed by an agricultural work vehicle, the method comprising:
    accessing a soil carry capacity map of an area to be worked by the agricultural work vehicle;
    receiving load data of the agricultural work vehicle so as to determine the agricultural work vehicle load; and
    determining by the processor the work trajectory to be followed by the agricultural work vehicle,
    wherein the work trajectory is determined by correlating the soil carry capacity map and the load data of the agricultural work vehicle, so as to optimize that the area to be worked with low carry capacity is worked with low agricultural work vehicle load.

* * * * *